United States Patent
Benkreira et al.

(10) Patent No.: US 12,248,750 B2
(45) Date of Patent: Mar. 11, 2025

(54) ACCELERATED FORM COMPLETION WITH EMAIL ADDRESS ANALYTICS

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/879,151

(22) Filed: Aug. 2, 2022

(65) Prior Publication Data
US 2024/0046030 A1 Feb. 8, 2024

(51) Int. Cl.
| | | |
|---|---|---|
| G06F 17/00 | (2019.01) | |
| G06F 40/174 | (2020.01) | |
| G06F 40/205 | (2020.01) | |
| G06F 40/295 | (2020.01) | |
| G06F 40/30 | (2020.01) | |
| G06Q 40/03 | (2023.01) | |

(52) U.S. Cl.
CPC .......... G06F 40/174 (2020.01); G06F 40/205 (2020.01); G06F 40/295 (2020.01); G06F 40/30 (2020.01); G06Q 40/03 (2023.01)

(58) Field of Classification Search
CPC .... G06F 40/174; G06F 40/205; G06F 40/295; G06F 40/30; G06Q 40/03
See application file for complete search history.

(56) References Cited

U.S. PATENT DOCUMENTS

| | | | |
|---|---|---|---|
| 2004/0181749 A1* | 9/2004 | Chellapilla | G06F 40/174 715/222 |
| 2005/0198563 A1* | 9/2005 | Kristjansson | G06F 40/174 715/224 |
| 2008/0027893 A1* | 1/2008 | Cavestro | G06F 16/313 707/E17.084 |
| 2009/0204881 A1* | 8/2009 | Murthy | G06F 40/174 715/226 |

(Continued)

OTHER PUBLICATIONS

Wang, Shaohua. Assisting End-users in Filling out Web Services. Diss. 2016 (Year: 2016).*

(Continued)

*Primary Examiner* — Andrew T McIntosh
(74) *Attorney, Agent, or Firm* — KDW Firm PLLC; Andrew D. Kasnevich

(57) ABSTRACT

Disclosed embodiments accelerate web form completion based on email address analytics. An email address can be input with respect to a web form and identified. The email address can be parsed into a username and a domain name and analyzed. A value of a web form field can be determined based on data extracted from the username, domain name, or both. The determined value can then be employed to automatically complete a corresponding web form field Values for additional fields can be computed based on the determined value alone or combined with data from other sources. User input and interaction with a web form can be monitored and used as a basis to dynamically complete additional fields, alter fields, or clear field values.

20 Claims, 8 Drawing Sheets

(56) References Cited

U.S. PATENT DOCUMENTS

| | | | |
|---|---|---|---|
| 2012/0054263 A1* | 3/2012 | Demant | G06F 9/54 |
| | | | 709/203 |
| 2014/0122501 A1* | 5/2014 | Shen | G06Q 10/10 |
| | | | 707/E17.014 |
| 2014/0195888 A1 | 7/2014 | Alford et al. | |
| 2016/0217119 A1* | 7/2016 | Dakin | G06F 40/274 |
| 2017/0262421 A1 | 9/2017 | Yue | |
| 2018/0260085 A1 | 9/2018 | Whitelaw et al. | |
| 2019/0179954 A1 | 6/2019 | Mardikar | |
| 2020/0073924 A1 | 3/2020 | Sokol et al. | |
| 2020/0110795 A1* | 4/2020 | Gupta | G06F 40/30 |
| 2020/0233977 A1* | 7/2020 | Chickerur | G06F 21/6254 |
| 2020/0242588 A1 | 7/2020 | Rule et al. | |
| 2021/0036865 A1* | 2/2021 | Young | H04L 9/3247 |
| 2021/0342353 A1* | 11/2021 | Jagota | G06F 16/24558 |

OTHER PUBLICATIONS

Wang, Shaohua, et al. "An intelligent framework for auto-filling web forms from different web applications." International Journal of Business Process Integration and Management 8.1 (2017): 16-30 (Year: 2017).*

Winckler, Marco, et al. "An approach and tool support for assisting users to fill-in web forms with personal information." Proceedings of the 29th ACM international conference on Design of communication. 2011 (Year: 2011).*

Lin, Xu, Panagiotis Ilia, and Jason Polakis. "Fill in the blanks: Empirical analysis of the privacy threats of browser form autofill." Proceedings of the 2020 ACM SIGSAC Conference on Computer and Communications Security. 2020 (Year: 2020).*

* cited by examiner

ACCELERATED FORM COMPLETION WITH EMAIL ADDRESS ANALYTICS

BACKGROUND

Web forms are ubiquitous and enable sophisticated transactions online. Web forms have transformed industries where paperwork and documentation play a significant role, such as finance, medicine, and real estate. A web form is a mechanism for acquiring user input. The form is an interactive web page that resembles a paper form that includes various elements such as text boxes, checkmarks, and radio buttons. In some instances, a web form can include client-side validation controls to check that provided data is a correct type or satisfies certain constraints. User input received through a web form is provided to a server for subsequent processing. For instance, a server can determine whether to grant or deny a loan application.

SUMMARY

The following presents a simplified summary to provide a basic understanding of some aspects of the disclosed subject matter. This summary is not an extensive overview. It is not intended to identify necessary elements or to delineate the scope of the claimed subject matter. Rather, this summary presents some concepts in a simplified form as a prelude to the more detailed description presented later.

Briefly described, disclosed aspects relate to accelerated form completion with email address analytics. Email addresses can provide a rich source of information about a user that can be mined and utilized to automatically complete form fields. A request for an email address can be presented first or at the top of an online or web form. An input email address can be parsed to extract the username and domain name from the address. The username can be analyzed to determine, predict, or infer a user's first and last name in one instance. The domain name can be analyzed to identify or predict a business name, which can correspond to an employer of the user. Further, data sources and advanced analytics can be employed to determine or infer additional pertinent information, such as employer address and annual salary. Form fields can be identified and analyzed to determine field type. Subsequently, one or more form fields can be automatically completed based on the data determined or inferred from an email address and additional data sources. Completed data fields can be monitored for user changes. After detecting a change in a completed field, dependent data fields can be cleared, reevaluated based on a change, and automatically completed.

According to one aspect, disclosed embodiments can include an analytics-based form completion system that comprises a processor coupled to a memory that includes instructions that, when executed by the processor, cause the processor to identify an email address input in a first field of a web form, parse the email address into a username and domain name, invoke natural language processing on the username to identify at least one of a given name, surname name, or portion of the given name or the surname, scan the web form to identify a given name field and a surname field, and automatically fill at least one of the given name field with the given name or portion of the given name or the surname name with the surname field or portion of the surname. The instructions can further cause the processor to classify the email address as personal or business based on comparing the domain name to known personal and business domain names. Further, the instructions can cause the processor to determine an enterprise name associated with a business domain of a business email address, identity employer name field in the web form, and fill in the employer name field with the enterprise name. The instructions can also cause the processor to look up an address associated with the enterprise name in a database, identify an employer address field in the web form, and fill in the employer address field with the address. Further, the instructions can cause the processor to determine a salary range for enterprise employees from a data source, identify a salary field in the web form, and complete the salary field with the salary range. The instructions can additionally cause the processor to invoke the natural language processing to identify an enterprise name from the user name and fill in an employer field with the enterprise name. In one instance, the web form is an online financial account application. The instructions can also cause the processor to detect a change to a filled field, identify a dependent field with a value dependent on an unchanged value of the filled field, and remove the value in the dependent field. Further, the instructions can cause the processor to determine a value for the dependent field based on the change to the filled field and complete the dependent field with the value. In one scenario, the filled field comprises an incomplete value, and the change is a complete value.

In accordance with another aspect, disclosed embodiments can include a method comprising executing, on a processor, instructions that cause the processor to perform operations associated with automatic form completion. The operations include identifying an email address in a first field of a web form, parsing the email address into a username and domain name, invoking a machine learning model to determine at least one of a given name, surname, or portion of the given name or surname from the username, identifying one or more name fields in the web form, and automatically filling the one or more name fields with the given name, surname, or portion of the given name or the surname. The operations can further comprise determining a company name associated with the domain name and completing an employer field with the company name. Further, the operations can include looking up an address associated with the company name in a database, identifying an employer address field in the web form, and filling in the employer address field with the address. The operations can also include determining a salary range for employees of a company from a data source based on the company name, identifying a salary field in the web form, and completing the salary field with the salary range. Further, the operations can comprise detecting a change to a completed field, identifying a dependent field with a value that depends on an unchanged value of the completed field, and removing the value from the dependent field. Furthermore, the operations can comprise determining a value for the dependent field based on the change to the completed field and completing the dependent field with the value.

According to yet another aspect, disclosed embodiments can include a computer-implemented method. The method can comprise acquiring an email address associated with an online financial account form; parsing the email address into a username and domain name, performing semantic analysis on the user name to identify a given name, a surname, or a portion of the given name or surname, identifying a given name field and a surname field in the form, and filling at least one of the given name field with the given name or portion of the given name or the surname name field with the surname or portion of the surname automatically. The method can further comprise classifying the email address as personal or business based on the domain name or username, determining a company name from the domain name when the email address is classified as a business email, and completing an employer field with the company name. Further, the method can comprise detecting a change to a completed field, identifying a dependent field with a value that depends on an unchanged value of the completed field, determining a value for the dependent field based on the change to the completed field, and completing the dependent field with the value.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Users are impatient with computing technology that does not respond instantly. However, importance seems to play a part in how long a user is willing to wait. For example, if a user is accessing a website for entertainment, the user might give up and move on to something else if a webpage does not load within two seconds. By contrast, if the user is attempting to order something online that is greatly discounted, the user might wait fifteen to twenty seconds before moving on to something else. This impatience also applies to online applications or web forms in that the longer a form takes to complete, the less likely a user is to complete the form, and the more likely the user will move on to something else.

In the financial sector, various laws and regulations require financial institutions to know their customer. Thus, various information is needed in the application to create accounts, such as name, address, phone number, employer, position, and salary. Consequently, the application process can take a significant amount of time and negatively impact customer acquisition.

Disclosed embodiments may employ email address analytics to accelerate form completion. An email address can be acquired from an online or web form field. In one instance, the email address field can be one of the first fields in a form. The email address can be parsed to extract the username and domain name from the email. The username is analyzed to determine a user's given or first name, surname or last name, or both, among other things such as birth year and location. The domain name can also be analyzed to identify a business as an employer of a user. Based on the analysis result, corresponding fields in the web form can be located and filled. Through more advanced analytics and third-party data sources, additional information can be inferred about a user, such as location, occupation, and salary range, which can be utilized to complete additional portions of a form. Further, user action and input on a form can be monitored and employed as a basis to remove, alter, or change completed field values. The accelerated form completion optimizes and decreases the time to fill out various financial applications or other online forms.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
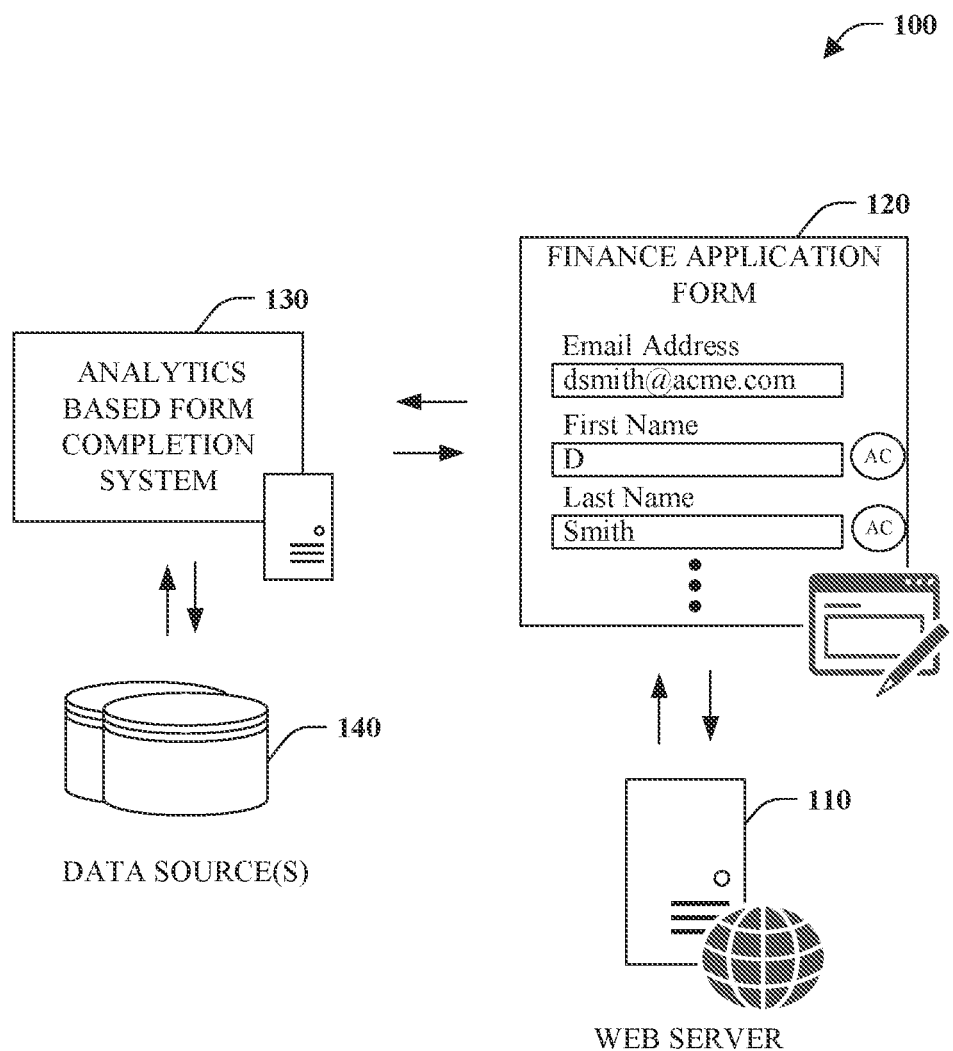
FIG. 1 illustrates an overview of an example implementation.

Referring initially to FIG. 1, a high-level overview of an example implementation 100 is depicted. The implementation 100 includes web server 110, finance application form 120, analytics-based form completion system 130, and one or more data sources 140.

The web server 110 can be configured to deliver content or services to users over the internet. The web server 110 may comprise physical computing hardware and software that delivers content or services to a client computing device (e.g., a user's computer) in response to a request from a web browser. In this implementation, the web server 110 can belong to a financial institution that employs the web server 110 to distribute information regarding financial products and services online by way of web pages. Further, the web server 110 can provide an online or web form for structured receipt of user input, for example, for an account or finance application.

The finance application form 120 can be an online or web form generated by the web server 110. After generation, the finance application form 120 can be provided to and displayed by a web browser of a user computing device. The finance application form 120 is employed by a financial institution to acquire information about a person requesting financing for use in deciding whether or not to offer a loan to the person. The information can include name, birth date, social security number, address, employer name and address, annual income, and phone number, among other things.

The finance application form 120 can include the same questions and features as a paper application. However, by virtue of the electronic nature of the finance application form 120, controls can also be employed that present data and make it easier for users to enter, edit, or make a selection. Examples of form controls include a text box, check box, group box, button, list box, spin button, scroll bar, or calendar. For simplicity in illustration and not limitation, the finance application form 120 includes three textboxes: email address, first name, and last name. Unlike typical forms, email address is presented first or toward the top. Here, the email address "dsmith@acme.com" is input by a user in the text box.

The analytics-based form completion system 130 can be operable to automatically complete fields of a web form, here, the finance application form 120. The analytics-based form completion system 130 can be resident on the web server 110, another server, or a user computing device. Moreover, field values can be determined or inferred based on analysis of a provided email address. By placing a request for a person's email address at or near the beginning of the form, it can be utilized to determine or infer values for fields that follow.

The completion system 130 can parse the email address "dsmith@acme.com" to separate and extract the user name and the domain name from the email address. The username is the alphanumeric text that appears before the "@" symbol, and the domain name is the alphanumeric text that appears after the "@" symbol. Here, the username is "dsmith," and the domain name is "acme.com." The user name and domain name can next be analyzed.

As per the username, natural language processing can be used to interpret and analyze the user name. For example, the username can be analyzed for parts of a user's real name, such as first name, middle name, last name, or suffix. Here, it can be determined that the last name or surname of the person is "Smith." and the first letter of the person's first name is the letter "D." This can be determined based on a common username pattern of the first letter of the first name followed by the last name. Further, it can be determined that "Smith" is a common last name, but "Dsmith" is uncommon or unknown. Other information can also be determined if the user name is fanciful. Consider, for example, the email address "Don-crabshacknashvilleir@gmail.com." In this case, it can be determined or inferred that the person's first name or given name is "Don," who owns or is employed by a business named "Crab Shack" in Nashville.

A data source 140, such as a database, can be searched on the domain name side to determine whether the email is associated with a business or individual account. The data source 140 can be an existing native or third-party persistent data store that at least includes domain names and a label as to whether the domain name is personal or business. If the domain is personal (e.g., gmail.com), not much more can be determined. However, if the domain is business, more information can be gleaned, such as the business name, address, phone number, and type of business. In one instance, the data source 140 can include a separate database or table that provides additional information regarding a business. In this example, the domain name is "acme.com," which can be deemed a business. The business name, address, and phone number can be looked up in the data source 140. An additional third-party database can also be employed with further analytics to determine further information. For example, a database can include salary ranges for employees of a particular company. In this case, the salary information can be acquired and associated with a particular user.

After or concurrently with determining information based on the email address, form fields can be identified that can be completed based on determined data. Subsequently, the determined or inferred data can automatically be utilized to complete a field. Completing a field can correspond to entering text in a text box, selecting an option in a drop-down menu, or activating a radio button, among other things. In the ongoing example, the first name text box can be filled with the first initial "D," and the last name text box can be entered as "Smith." Further, an indication can be provided, such as a symbol including an encircled "AC" to indicate that the field was automatically completed. In this manner, a user can view the automatically completed fields as suggestions or recommendations that can be accepted or rejected.

Unlike a phone number, an email address can provide a rich data source regarding a person. However, the data may not always be accurately determined or inferred. Accordingly, the form can be monitored and updated as needed. For instance, the form can be monitored for changes made by a user to an automatically completed field. If a change is detected, other dependent form fields can be identified, and an automatic completion can be removed or updated in view of the change. For example, if an incorrect business is identified, which is corrected by a user, information in fields associated with a business address and phone number can be cleared or replaced by information associated with an updated field value. In one instance, there may not be relevant salary information for employees of the updated business name, so that field can be cleared if it was previously completed automatically.

Figure 2:
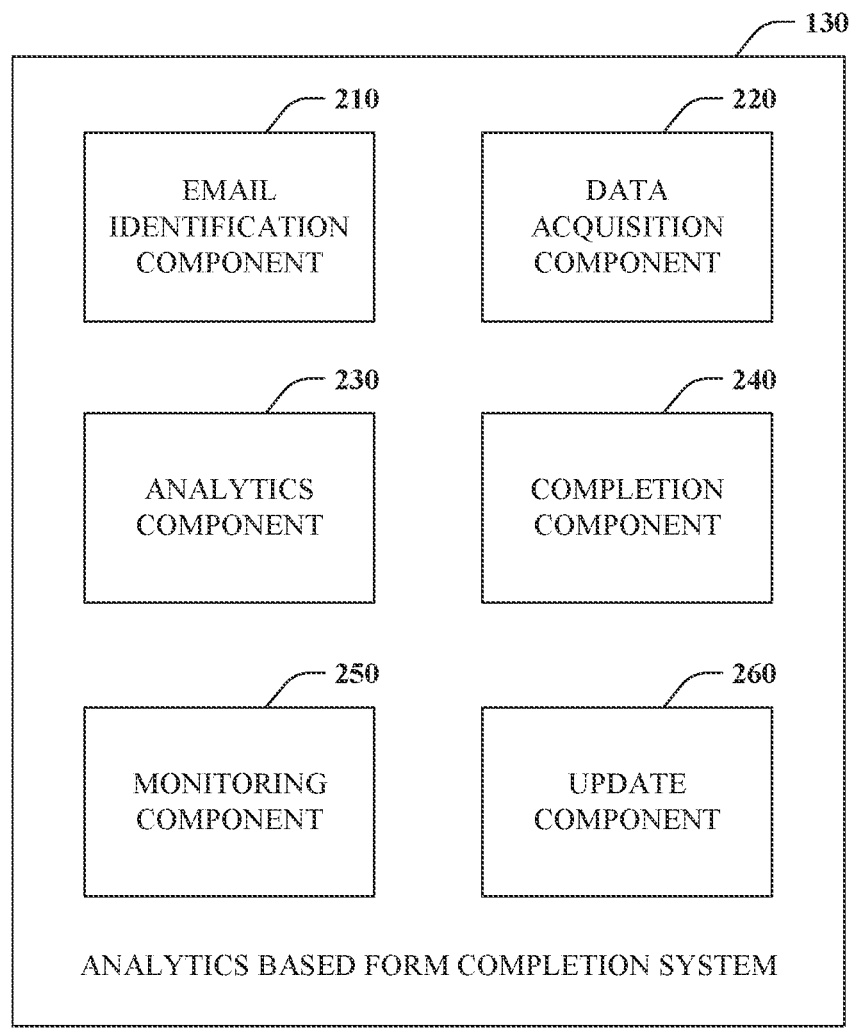
FIG. 2 is a block diagram of an example analytics-based form completion system.

FIG. 2 is a block diagram of an example analytics-based form completion system 130. The form completion system 130 can include email identification component 210, data acquisition component 220, analytics component 230, completion component 240, monitoring component 250, and update component 260. The email identification component 210, data acquisition component 220, analytics component 230, completion component 240, monitoring component 250, and update component 260 can be implemented by a processor coupled to a memory that stores instructions that cause the processor to perform the functionality of each component when executed. Consequently, a computing device can be configured to be a special-purpose device or appliance that implements the functionality of the analytics-based form completion system 130. Further, all or portions of the analytics-based form completion system 130 can be distributed across computing devices or made accessible by way of a network service.

The email identification component 210 can be configured to receive, retrieve, or otherwise obtain or acquire an email address associated with an online or web form. The web form can include a text box to specify an email address comprising a user name "@" symbol and domain name. After entry of the email address, the form can forward a copy of the email address for further processing. Alternatively, the form can be monitored externally for the email address based on computer vision technology to capture the email address, or keystrokes can be monitored when data is entered into an email field. In one embodiment, the field for the email address can be presented first or toward the top of the form. Further, the form may require or nudge a user to complete the email address first. In another instance, an email entry can be required before the form is opened or before allowing entry of other fields. Regardless of acquisition mechanism, the email identification component 210 can obtain an email address provided in or associated with a form.

The data acquisition component 230 can be operable to access one or more data stores. The data stores can comprise public and private data sets for use by the analytics component 230 in determining or inferring form field data. For example, the data set can comprise information regarding businesses such as their websites, geographic location addresses, type of business, and average salary. Other data sets can include the popularity of baby names at particular points in time and average life span, among other things.

The analytics component 230 can be operable to analyze data and make predictions regarding values of form fields based on analysis results. Per one embodiment, the analytics component 230 can analyze email addresses. First, an email address can be parsed to extract a username and domain name from the email address. The username can be analyzed to identify the presence of names, such as first name/given name and last name/surname, or portions thereof, such as initials. Usernames can have patterns. For example, a user name may be first name dot last name or first initial dot last name. The analytics component 230 can perform pattern matching to identify name elements. For instance, the first name initial "J" and the last name "Smith" can be identified from the user name "jsmith." Further, the analytics component 220 can assign probabilities or confidence levels to identified portions of a name.

The username can also be analyzed for additional content. More specifically, natural language processing can be employed to identify relevant content from the username. For example, some usernames can include information in addition to, or as a substitute for, a first name or last name. Suppose the username is "joe-shrimpshack-Nashville." Here, the first or given name "Joe" can be identified. Further, the business name "Shrimp Shack" and location "Nashville" can be determined. In other instances, a year can be identified as an individual's birth year. Consider "Joe1978" as a user name. In this scenario, the first name "Joe" can be identified as a first name, and the year "1978" can be extracted and predicted to correspond to the birth year of "Joe." Additional data from one or more sources can also be utilized to infer names. For example, it can be determined that "Joe" is a short form or nickname for "Joseph," "Josef," or "Jozef." Utilizing 1978 as the birth year, a database of popular baby names in 1978 can be referenced to infer or predict the correct full name to be "Joseph."

The domain name can be analyzed using natural language processing to determine pertinent information. For example, the analytics component 230 can first be configured to classify the domain as a business domain or personal domain based on known personal domains (e.g., gmail.com, outlook.com). For a domain classified as a business domain, analysis or a lookup can be performed to identify the corresponding business. In one instance, the business name can be included in the domain name prior to the dot and domain extension (e.g., .com, .net, .org). However, the domain may not accurately reflect the business entity. Accordingly, a data source such as a business lookup table can be employed. For example, the domain "capitalone.com" can be used as a key to look up the business entity, namely Capital One Financial Corporation. Further, information about the business can also be accessed through a data source, such as a business address, phone number, office locations, and business type. Additional data sources can provide further detail, such as job types and salary ranges for business employees.

The completion component 240 can be operable to complete or aid in completing form fields. The completion component 240 determines the type of information solicited by a field of the form and seeks to identify data produced by the analytics component 230 related to a particular field. The identified data can then be utilized to complete a field by filling or other means. In one instance, the completion component 240 can make a suggestion or recommendation as to how to complete the field, which a user can accept or reject. Further, a hybrid approach can also be employed in which a field is completed automatically together with an indication (e.g., graphic indicator) that the field completion is suggested.

Figure 3:
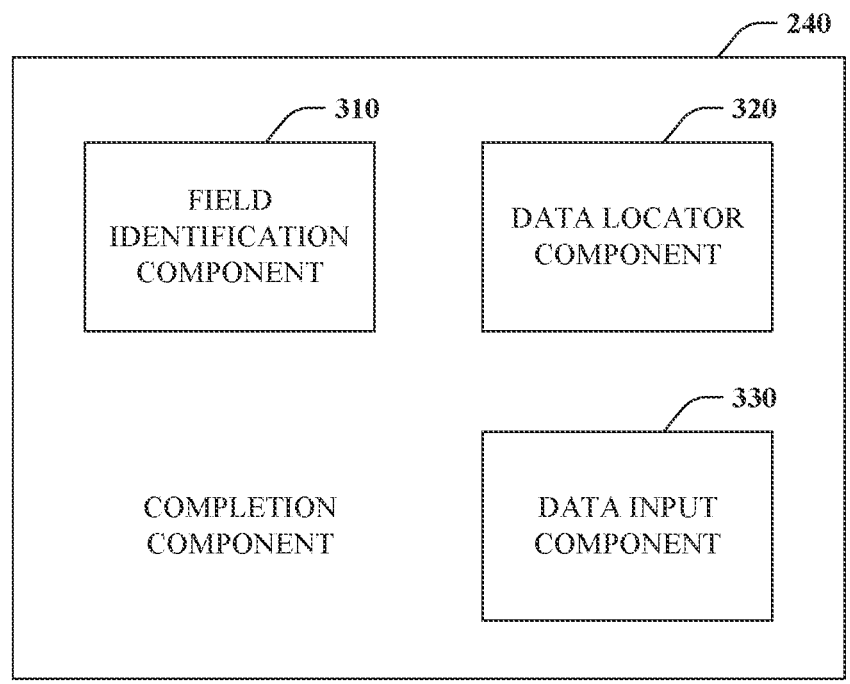
FIG. 3 is a block diagram of an example completion component.

Turning attention briefly to FIG. 3, an example completion component 240 is illustrated in further detail. The completion component 240 can include a plurality of subcomponents, including field identification component 310, data locator component 320, and data input component 330.

The field identification component 310 can be operable to identify a field in a form and determine the field type. A field is a structure in a form that accepts and holds input data. Examples of a field include a text box, drop-down menu, and buttons. The field identification component 310 can locate the fields with computer vision technology applied over a presented form. Alternatively, the field identification component 310 can identify fields based on analysis of programmatic code associated with the form and presentation of the form or related metadata. Further, the type of field can also be determined. The field type can indicate the type or kind of data solicited by the field. For instance, the field type can be email address, first name, last name, address, phone number, identification number, or employer name. The type can be determined from the presentation of the form utilizing optical character recognition to extract text and natural language processing to determine what input is being requested. For example, text above or below a text box can be the word "Name," which corresponds to the type of the field. Likewise, natural language processing, search, or pattern matching can be performed on form programmatic code or metadata to determine the type. In one instance, programmatic code can explicitly or implicitly specify the field type. The field identification component 310 can then search for and locate the field type.

The data locator component 320 can be operable to identify data associated with completing a field. The data locator component 320 can receive, retrieve, or otherwise obtain or acquire a field type determined by the field identification component 310. Based on the field type, data can be located that matches the field type. In one instance, the analytics component can label or tag data with corresponding field types to expedite subsequent processing. For example, the field type can be the first name, and data can include the name "John" with a first name label. Accordingly, the data locator component 320 can seek to locate data that matches a field type.

The data input component 330 can be operable to automatically input data into a form. The data input component 330 is configured to input data with respect to various fields. In one instance, the data input component 330 can input text into a text box field. For example, if the data locator component 320 identifies "John" as the value for a first name field, the string "John" can be input into the text box. The data input component 330 is also configured to toggle a button on or off or select an option from a drop-down menu based on data located for a field by the data locator component 320. Suppose, for example, yes and no radio buttons are provided on a form that ask whether an individual resides in a particular state or not. The data input component can evaluate an address provided, including the state, and activate the yes or no buttons based on whether or not the state matches the particular state. Further, the data input component 330 can provide data as a recommendation or suggestion and identify the data graphically, for example, with an icon or distinct color.

Returning to FIG. 2, the monitoring component 250 can be operable to monitor user interaction with the form. The interaction can correspond to explicitly or implicitly (e.g., scrolling down) accepting an automatic completion or suggested completion. Further, the interaction can involve entering input into uncompleted fields. Further yet, the interaction can pertain to changing an automatic completion to a different value or completing a partial completion of a field. A user's values entered into a form can be intercepted prior to entry or copied from the form after entry. An automatically completed field can also include a trigger that is activated if the value is changed in one instance.

The update component 260 can be operable to update one or more dependent form fields. The update component 260 can be triggered by detection that a user changed a value of an automatically completed field. The update component 260 can subsequently determine automatically completed fields that depend on the changed field. In one instance, dependency can be tracked and recorded prior to automatic completion. In this situation, dependencies can be looked up or otherwise acquired. For example, an employer's address depends on the employer. Accordingly, if the user changes the employer's name, the address is a dependent field. In another instance, all entry values that follow the changed field can be deemed to be dependent. For instance, if the user's last name is changed, all other fields can depend on the user's identity. After a dependent field is identified, the update component 260 can clear the value of the dependent field or suggested completion. Further, the update component 260 can optionally trigger reevaluation of dependent fields based on the change entered by the user. For example, if the user changes the name of his employer, the address of the newly entered employer can be looked up and automatically completed.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Furthermore, one or more components and/or sub-components may be combined into a single component to provide aggregate functionality. Communication between systems, components, and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed thereby, making portions of the systems and methods more adaptive as well as efficient and intelligent. By way of example, and not limitation, the analytics-based form completion system 130 and components thereof can employ these mechanisms to identify fields and requested input, determine or infer data for field completion, as well as monitor and update fields. For instance, computer vision, optical character recognition, and natural language processing can be performed to identify and monitor fields and requested input. Further, predictive models can be generated to classify email addresses as personal or business as well as parse and comprehend the meaning of a string of characters and numbers.

Still further yet, a predictive model (e.g., supervised machine learning model) can be trained to infer or predict one or more field values. The predictive model can be trained and optimized based on prior completed applications. In this manner, the predictive model may be able to identify patterns that are otherwise unknown for automatic completion. Furthermore, the predictive model can account for many factors and present a predicted value with a confidence score that accounts for the factors. For example, the predictive model can recognize the pattern of first initial followed by last name associated with a particular domain. The predictive model can return a last name with high confidence in this instance. The predictive model can also receive feedback regarding field completion values that a user changed to update the model and associated weights.

In view of the example systems described above, methods that may be implemented in accordance with the disclosed subject matter will be better appreciated with reference to flow chart diagrams of FIGS. 4-7. While, for purposes of simplicity of explanation, the methods show and describe a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
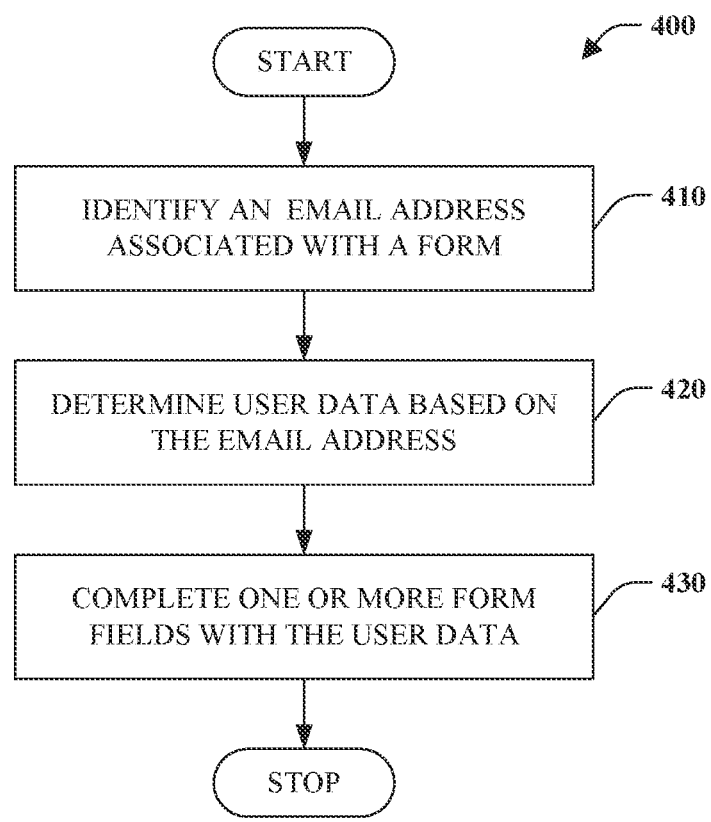
FIG. 4 is a flow chart diagram of a method of automatic field completion based on email address analytics.

Turning attention to FIG. 4, a method 400 of automatic field completion based on email address analytics is illustrated. The method 400 can be performed by the analytics-based form completion system 130 or components thereof.

At 410, the method 400 can identify an email address associated with an online or web form. In accordance with one embodiment, the email address can be entered into a form field at the top or toward the beginning of the form. The email address can be received, retrieved, or otherwise obtained or acquired from the form. For instance, the field can be programmed to transmit the email address for further processing. Alternatively, the email address can be requested and received before opening the form.

At 420, the method 400 can determine user data based on the email address. The email address can provide a unique source of data about the user. Often a username includes at least portions of a user's real name, such as first name initial and last name, as well as other pertinent information such as birth year or location. The domain can also provide information about the user's place of employment. The email address can be parsed and semantically analyzed to determine a first and last name, among other things, associated with a username as well as a business name based on a domain name of a business email address. Additional user data can be determined or inferred based on other data sources. For example, an address of a user or employer can be identified from a data source based on the user or employer name determined or inferred from an email address.

At 430, the method can complete one or more form fields with the user data determined based on the email address. For instance, the first name, last name, or both can be automatically added in text box fields associated with the name of the user. Similarly, the user's address can be added to corresponding text box fields. It is to be appreciated that fields can vary in type. For example, some fields can be text boxes while others can correspond to drop-down menus and radio buttons, among others. In this instance, data determined or inferred can be utilized to select a corresponding option from amongst menu or button options. Further, the completions can correspond to recommendations with a graphical indication of such.

Figure 5:
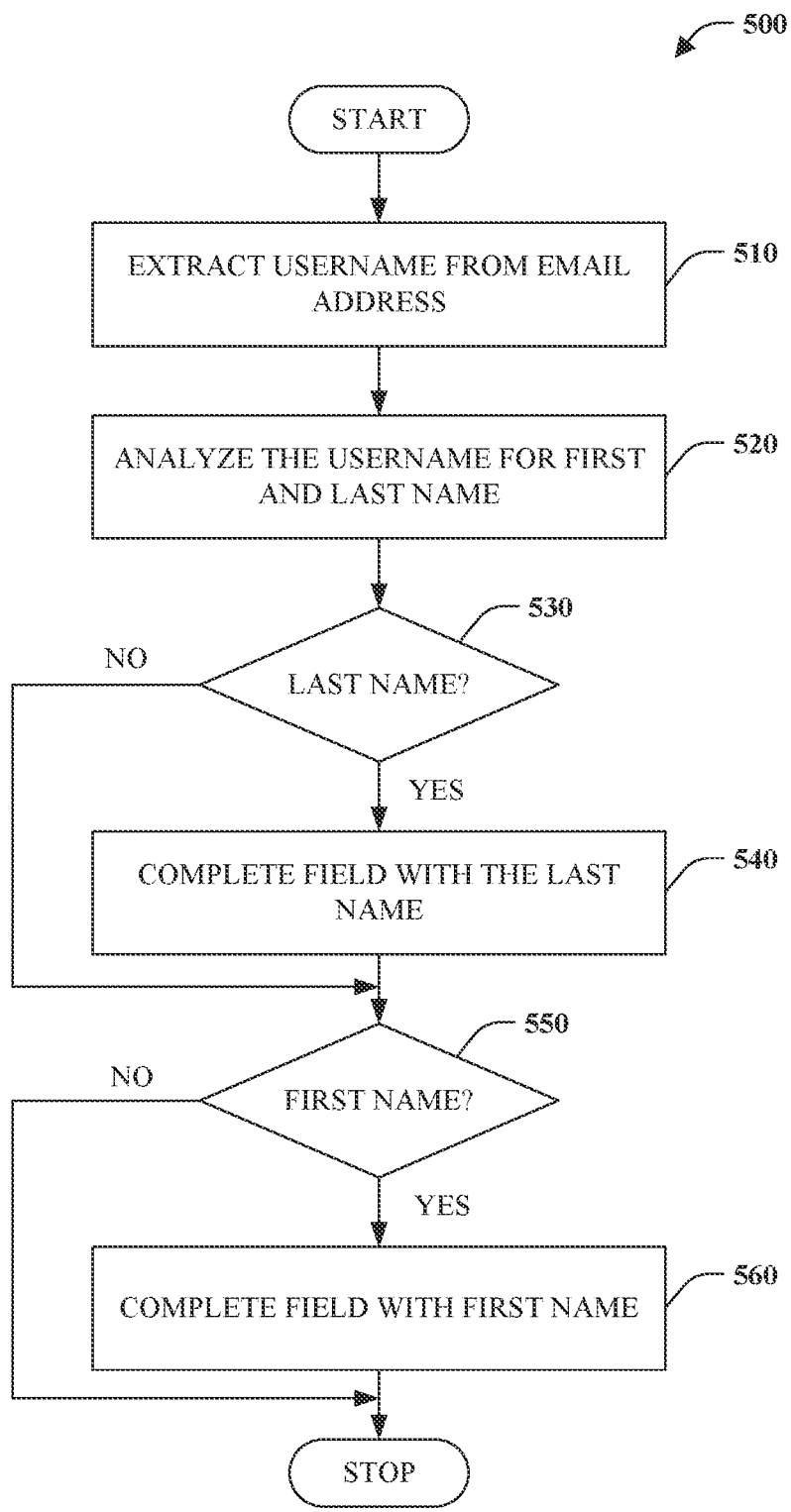
FIG. 5 is a flow chart diagram of a method of field completion based on an email username.

FIG. 5 is a flow chart diagram of a method 500 of field completion based on an email user name. The method 500 can be implemented and performed by the analytics-based form completion system 130 and associated components, including the email identification component 210, data acquisition component 220, analytics component 230, and completion component 240.

At numeral 510, the method 500 can extract the username from an email address. An email address comprises a username, "@" symbol, and domain name. An email address can be parsed to segment the username from the "@" symbol and domain name, for example, by extracting characters prior to the "@" symbol.

At 520, the method can analyze the username for at least a first name and a last name of an individual. The analysis can involve further parsing of the username and semantic analysis. In some instances, both a first name and last name can form part of the username, perhaps segmented by a delimiter such as a dash or an underscore. However, sometimes a delimiter is not present, and solely a portion of a first or last name may be present (e.g., jsmith). As such, the analysis can involve segmenting a string of characters comprising a username into a first and last name or first initial and last name, or the like.

At 530, the method 500 can be a determination as to whether or not a last name or surname has been determined or inferred from the username. If a last name is detected ("YES"), the method 500 continues at numeral 540, where a field is completed with the last name. If a last name is not detected ("NO"), the method 500 can continue at numeral 550.

At numeral 540, the method 500 can complete a field name with the last name. For example, a text box associated with a last name can be completed to include the last name. In one instance, a graphical indication can be associated with an automatically completed field to distinguish from fields completed by a user.

At 550, the method 500 can determine whether or not a first name was detected in the username. If a first name is not detected ("NO"), the method 500 can terminate. Alternatively, if a first name is detected ("YES"), the method continues at 560, where the field is completed with the first name before the method terminates. A business email username pattern is the initial of first name concatenated with full last name. It should be appreciated that an initial can be used to partially complete a first name field.

Figure 6:
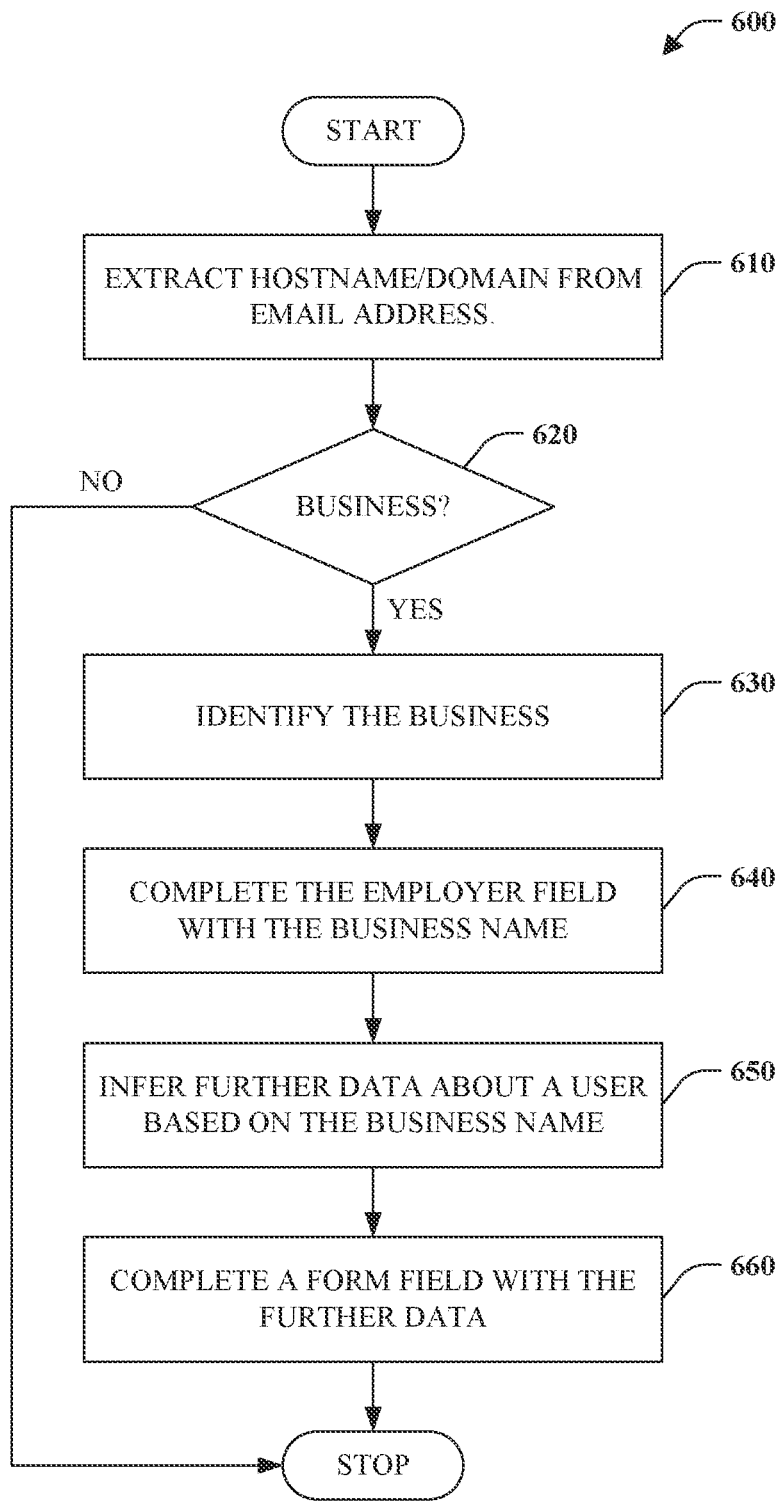
FIG. 6 is a flow chart diagram of a method of field completion based on an email domain name.

FIG. 6 illustrates a method 600 of automatic completion based on a domain name of an email address. The method 600 can be implemented and performed by the analytics-based form completion system 130 and components thereof, including the email identification component 210, data acquisition component 220, analytics component 230, and the completion component 240.

At reference numeral 610, the method 600 can extract the domain name or host name from an email address. An email address can comprise a username and domain name separated by "@." The email address can be parsed to extract the string that follows the at symbol as the domain name.

At 620, the method 600 can determine whether the email address is a business address or not. In one instance, a list of free personal email domain names (e.g., gmail.com, hotmail.com) can be stored and utilized for comparison. If the domain name matches a domain name on the list, the domain name can be classified as personal. Alternatively, if the domain name does not match any domain names on the list, the domain name can be classified as business. If the domain name is not classified as business ("NO"), the method 600 can terminate. If the domain name is classified as business ("YES"), the method 600 can continue at numeral 630.

At numeral 630, the method 600 can determine, infer, or otherwise identify a business associated with a business domain name. In one instance, the domain name can be subject to further parsing to segment the text of the domain from a domain extension (e.g., .com). Subsequently, the text can be parsed into different words where applicable. For example. "capitalone.com" becomes "capitalone" and then "Capital One." Additionally, or alternatively, a data source could be employed to look up the business name based on the domain name in whole or in part. For instance, "capitalone.com" could be a key in a table or dictionary that returns "Capital One Financial Corporation."

At 640, the method 600 can complete an employer field with the business name. For instance, a text field can be completed with a string corresponding to the business name. In one embodiment, a graphical indication can be associated with the completed field to indicate it was automatically completed. Further, the completion can correspond to a recommendation or suggestion to be accepted or rejected by a user.

At numeral 650, the method 600 can determine or infer further data about a user based on the domain name. In one instance, further data can be determined for an identified business. For example, a data source can be consulted that includes information about a business, such as locations, address, and phone number. Another data source can include information about the type of business, job types, and salary. By way of example, the business can be identified as a law firm that includes attorneys, paralegals, and secretaries, as well as reported salaries associated with the positions. Further, if the vast majority of employees are attorneys, it may be predicted that the user is an attorney. Other data sources, such as business websites, can be analyzed and data scraped to enable more fields to be filled. It can also be noted that data dependencies can be recorded.

At 660, the method 600 can automatically fill one or more additional fields based on the further data. For example, the address and phone number of a business can be added in the employer address and phone number fields. A graphical indication can be associated that the one or more additional fields were filled automatically.

Figure 7:
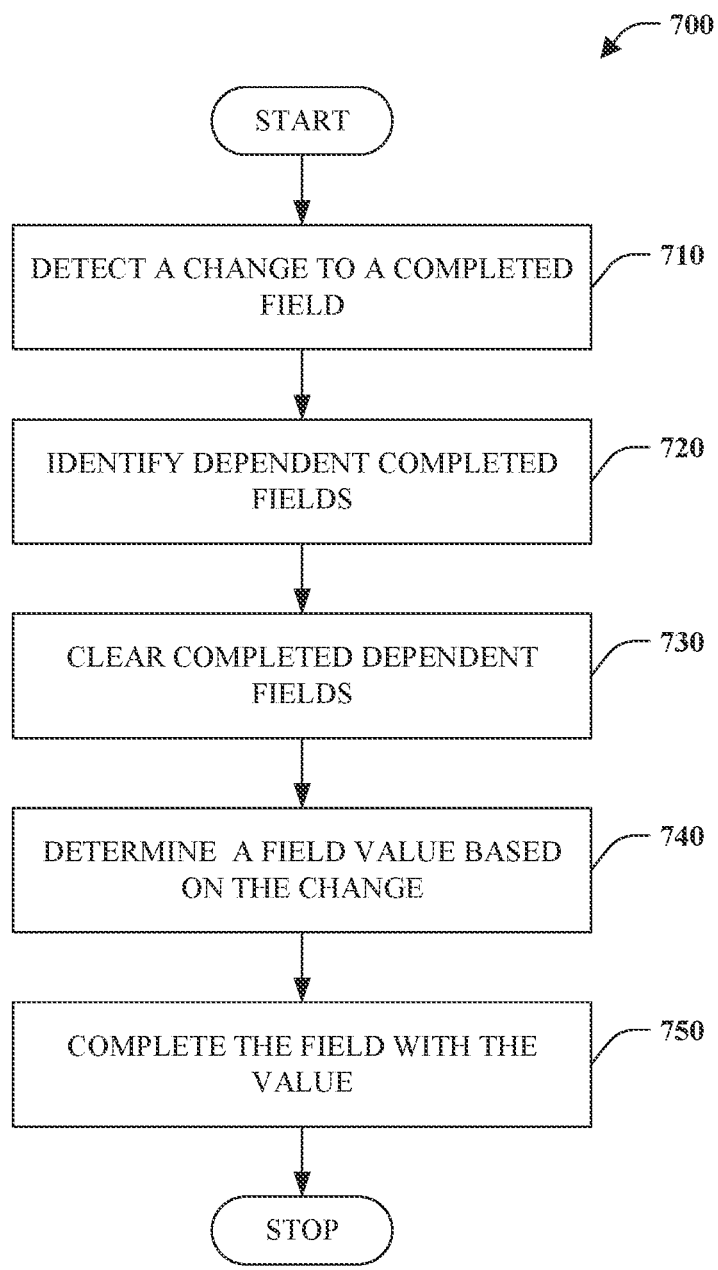
FIG. 7 is a flow chart diagram of a method of field updating.

FIG. 7 is a flow chart diagram of a method 700 of automatically updating field values in response to user changes. The method 700 can be implemented and executed by the analytics-based form completion system 130 and corresponding components, such as the monitoring component 250 and the update component 260.

At reference number 710, the method 700 can detect a change is to an automatically completed field. A field can be completed with data automatically. However, the data can be incorrect or incomplete. A user can correct the field value or reject a recommendation.

At 720, the method 70) can determine a dependent field. Fields can be completed based on data completed in other fields. For example, a user's first name and last name can depend on the email address field. Likewise, an employer can be dependent on the email address field. An employer address can depend on the employer name field as well as the email address field. In one instance, the data included in fields can be tagged with dependency data to aid expeditious determination of dependencies.

At numeral 730, the method 700 can clear a dependent field. The values of previously completed dependent fields can be removed. For example, if a user changes the employer name in the employer name field, the employer address and phone number can be cleared.

At 740, the method 700 can determine or infer a data field value can be for a cleared field. The data field value can be determined based on a change to a field by a user. For example, if a last name is changed from "Jones" to "Smith," fields that depend on the last name can be determined based on the new name "Smith." Similarly, a business address can be determined for "Acme Corporation" when entered by a user as employer name as a replacement for "Wonka Industries."

At reference 750, the method 500 can complete a field with the determined value. For example, the determined value can be entered into a cleared text box or used as a basis to select an option from a drop-down menu or activation of a button. Further, the determined value can be a suggestion or recommendation completion for a field that a user can accept or reject.

This disclosure pertains to the technical problem of online or web forms and completion thereof. The technical solution comprises accelerated form completion with email analytics. An email address can be acquired and analyzed to determine data relating to a user, such as a user's name and place of employment. A form can be analyzed to identify fields and requested data. Corresponding form fields can be completed automatically based on the data. Further data can be determined or inferred based on the data determined based on the email address and utilized as a basis to complete additional fields. User interaction with a form can also be monitored dynamically to detect changes to an automatically completed field. Fields that depend on a changed field can be cleared. Optionally, cleared fields can be reevaluated in view of a user change and automatically completed based on the change.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

Figure 8:
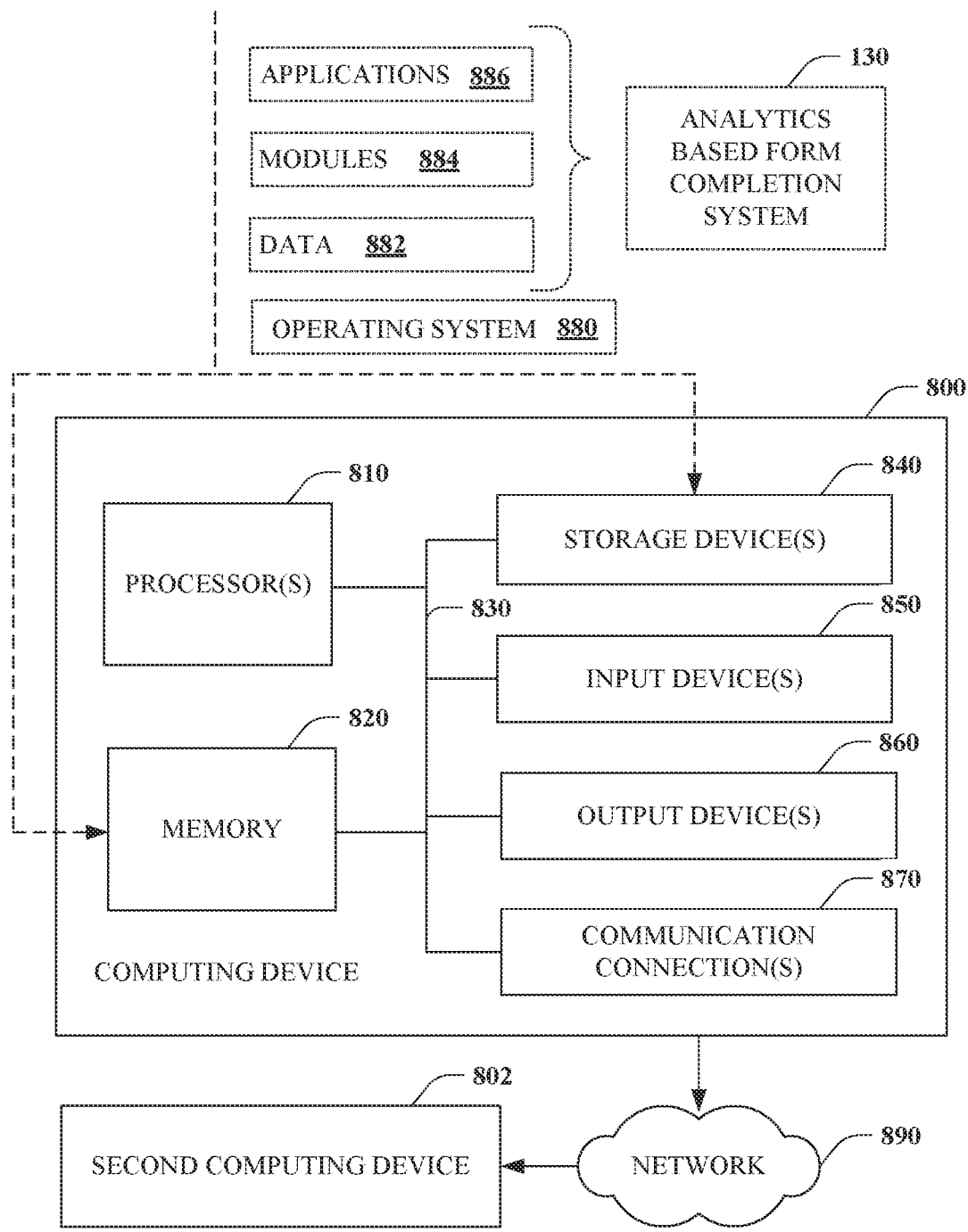
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, which perform particular tasks and/or implement particular abstract data types. Moreover, those skilled in the art will appreciate that the above systems and methods can be practiced with various computer system configurations, including single-processor, multi-processor, or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology to store information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read-only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine according to the logic provided.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the analytics-based form completion system 130 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the analytics-based form completion system 130 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a personal area network (PAN), local area network (LAN), or a wide area network (WAN) such as the internet. In one instance, the computing device 800 can correspond to a server executing the analytics-based form completion system 130. The second computing device 802 can correspond to a user device that enables users to receive and complete an online or web form. Alternatively, the computing device 800 can correspond to a client device that executes the analytics-based form completion system 130 with respect to a form provided over the network 890 from a second computing device 802. Further yet, the computing device 800 can correspond to a middle-tier computing resource that executes the analytics-based form completion system 130. The second computing device 802 can correspond to a web server that provides an online or web form for completion, such as a finance or account application.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. An analytics-based form completion system, comprising:
    a processor coupled to a memory that includes instructions that, when executed by the processor, cause the processor to:
        access a web form and receive an email address input from a first field thereon, the first field being configured to transmit the email address to the processor;
        parse the email address into a username and domain name;
        invoke natural language processing on the username to identify at least one of a given name, surname, or portion of the given name or the surname;
        analyze programmatic code associated with the web form or use computer vision technology applied over the web form to identify a given name field and a surname field;
        invoke a machine learning model to predict a given name field value and a surname field value, wherein the machine learning model is trained based on a plurality of prior completed field values;
        automatically fill at least one of the given name field with the given name field value or portion of the given name field value or the surname field with the surname field value or portion of the surname field value;
        generate a graphic indicator indicating that the at least one of the given name field or the surname field is automatically completed and that the given name field value or portion of the given name field value or the surname field value or portion of the surname field value are suggested data, wherein the graphic indicator includes an icon or distinct color identifying the suggested data graphically;
        detect an alteration to the suggested data by a user account associated with the form completion system; and
        in response to detecting the alteration to the suggested data, determine one or more dependent fields that depend on the field which includes the alteration and automatically alter suggested data in the one or more dependent fields based on the alteration to the suggested data made by the user account.

2. The system of claim 1, wherein the instructions further cause the processor to classify the email address as personal or business based on a comparison of the domain name to known personal and business domain names.

3. The system of claim 2, wherein the instructions further cause the processor to:
    determine an enterprise name associated with a business domain of a business email address;
    identify employer name field in the web form; and
    fill in the employer name field with the enterprise name.

4. The system of claim 3, wherein the instructions further cause the processor to:
    lookup an address associated with the enterprise name in a database;
    identify an employer address field in the web form; and
    fill in the employer address field with the address.

5. The system of claim 4, wherein the instructions further cause the processor to:
    determine a salary range for employees of the enterprise from a data source;
    identify a salary field in the web form; and
    complete the salary field with the salary range.

6. The system of claim 1, wherein the instructions further cause the processor to:
    invoke the natural language processing to identify an enterprise name from the username;
    locate an employer field in the web form; and
    complete the employer field with the enterprise name.

7. The system of claim 1, wherein the web form is an online financial account application; and
    wherein using computer vision technology includes the processor being caused to use optical character recognition to extract text and use natural language processing to determine what input is being requested by a first field and a second field to thereby identify the first field as the given name field and the second field as the surname field.

8. The system of claim 1, wherein the instructions further cause the processor to:
    detect a change to a filled field;
    identify a dependent field with a value dependent on an unchanged value of the filled field; and
    remove the value in the dependent field.

9. The system of claim 8, wherein the instructions further cause the processor to:
    determine a value for the dependent field based on the change to the filled field; and
    complete the dependent field with the value.

10. The system of claim 8, wherein the filled field is an incomplete value, and the change is a complete value.

11. A method, comprising:
    executing, on a processor, instructions that cause the processor to perform operations associated with automatic form completion, the operations comprising:
        accessing a web form and receiving an email address from a first field thereon, the first field being configured to transmit the email address to the processor;
        parsing the email address into a username and domain name;
        invoking natural language processing to determine at least one of a given name, surname, or portion of the given name or surname from the username;

analyzing programmatic code associated with the web form or using computer vision technology applied over the web form to identify one or more name fields in the web form;

training a machine learning model using a plurality of prior completed field values;

invoking the machine learning model to predict a given name field value and a surname field value;

automatically filling the one or more name fields with the given name field value, surname field value, or portion of the given name field value or the surname field value;

generating a graphic indicator indicating that the one or more name fields are automatically completed and that the given name field value, surname field value, or portion of the given name field value or the surname field value are suggested data, wherein the graphic indicator includes an icon or distinct color identifying the suggested data graphically;

detecting an alteration to the suggested data by a user account executing the automatic form completion; and in response to detecting the alteration to the suggested data, determining one or more dependent fields that depend on the field which includes the alteration and automatically altering suggested data in the one or more dependent fields based on the alteration to the suggested data made by the user account.

12. The method of claim 11, the operations further comprising:

determining a company name associated with the domain name; and completing an employer field with the company name.

13. The method of claim 12, the operations further comprising:

looking up an address associated with the company name in a database;

identifying an employer address field in the web form; and filling in the employer address field with the address.

14. The method of claim 11, the operations further comprising:

detecting a change to a completed field;

identifying a dependent field with a value that depends on an unchanged value of the completed field; and removing the value from the dependent field.

15. The method of claim 14, the operations further comprising:

determining a value for the dependent field based on the change to the completed field; and completing the dependent field with the value;

wherein using computer vision technology includes using optical character recognition to extract text and using natural language processing to determine what input is being requested by at least a first field and a second field to thereby identify at least the first field and the second field as the one or more name fields in the web form.

16. A computer-implemented method, comprising:

receiving, from a first field of an online financial account form, an email address on the online financial account form, the email address being an input in the first field of the financial account form, and the first field being configured to transmit the email address to a processor;

wherein processing the email address includes:

parsing, by the processor, the email address into a username and domain name;

performing, by the processor, semantic analysis on the username to identify a given name, a surname, or a portion of the given name or surname; and analyzing, by the processor, programmatic code associated with the online financial account form or using computer vision technology applied over the online financial account form to identify a given name field and a surname field in the online financial account form;

training a machine learning model using a plurality of prior completed field values;

invoking the machine learning model to predict a given name field value and a surname field value;

filling at least one of the given name field with the given name field value or portion of the given name field value or the surname field with the surname field value or portion of the surname field value automatically;

generating a graphic indicator indicating that the at least one of the given name field or the surname field is automatically completed and that the given name field value or portion of the given name field value or the surname field value or portion of the surname field value are suggested data, wherein the graphic indicator includes an icon or distinct color identifying the suggested data graphically;

detecting an alteration to the suggested data by a user account associated with the online financial account form; and in response to detecting the alteration to the suggested data, determining one or more dependent fields that depend on the field which includes the alteration and automatically altering suggested data in the one or more dependent fields based on the alteration to the suggested data made by the user account.

17. The method of claim 16, further comprising classifying the email address as personal or business based on the domain name or username;

wherein using computer vision technology includes using optical character recognition to extract text and using natural language processing to determine what input is being requested by at least a first field and a second field to thereby identify at least the first field as the given name field and the second field as the surname field in the form.

18. The method of claim 16, further comprising:

determining a company name from the domain name when the email address is classified as a business email; and completing an employer field with the company name.

19. The method of claim 16, further comprising:

detecting a change to a completed field;

identifying a dependent field with a value that depends on an unchanged value of the completed field;

determining a value for the dependent field based on the change to the completed field; and completing the dependent field with the value.

20. The system of claim 1, wherein the machine learning model is configured to present a first confidence score associated with the given name field value and a second confidence score associated with the surname field value.

* * * * *